L. WILPUTTE.
COAL CHARGING LORRY.
APPLICATION FILED SEPT. 1, 1916.
1,303,526.
Patented May 13, 1919.
2 SHEETS—SHEET 2.
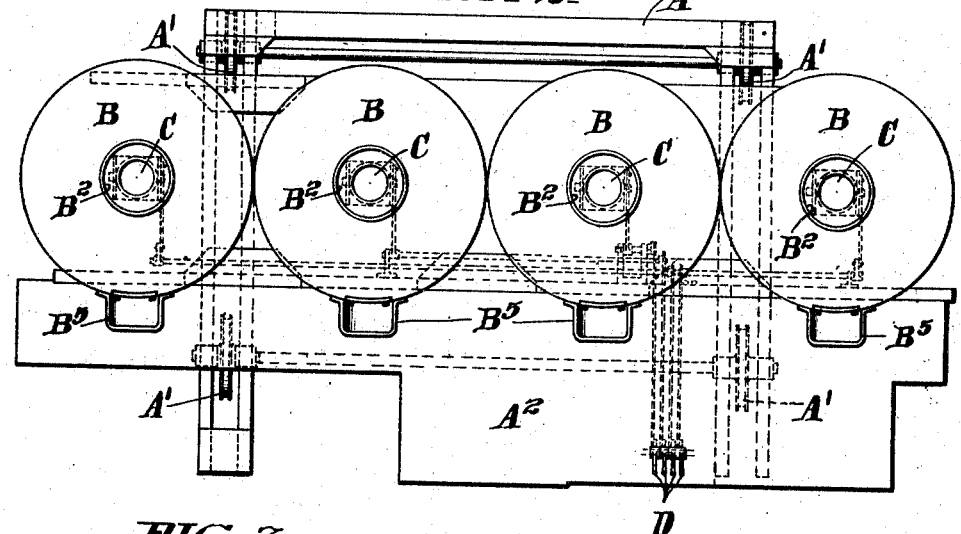
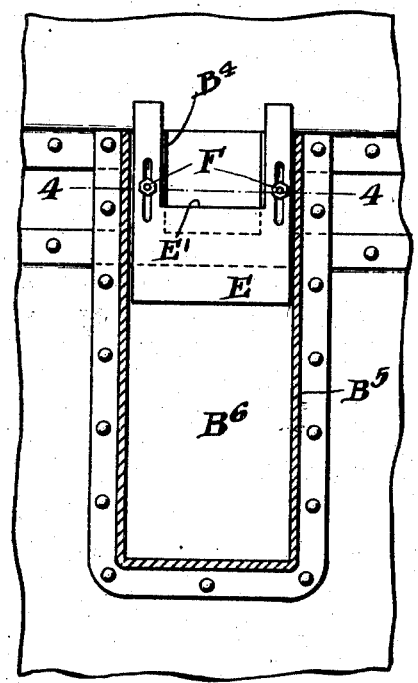
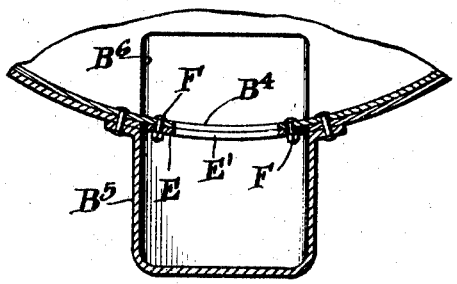

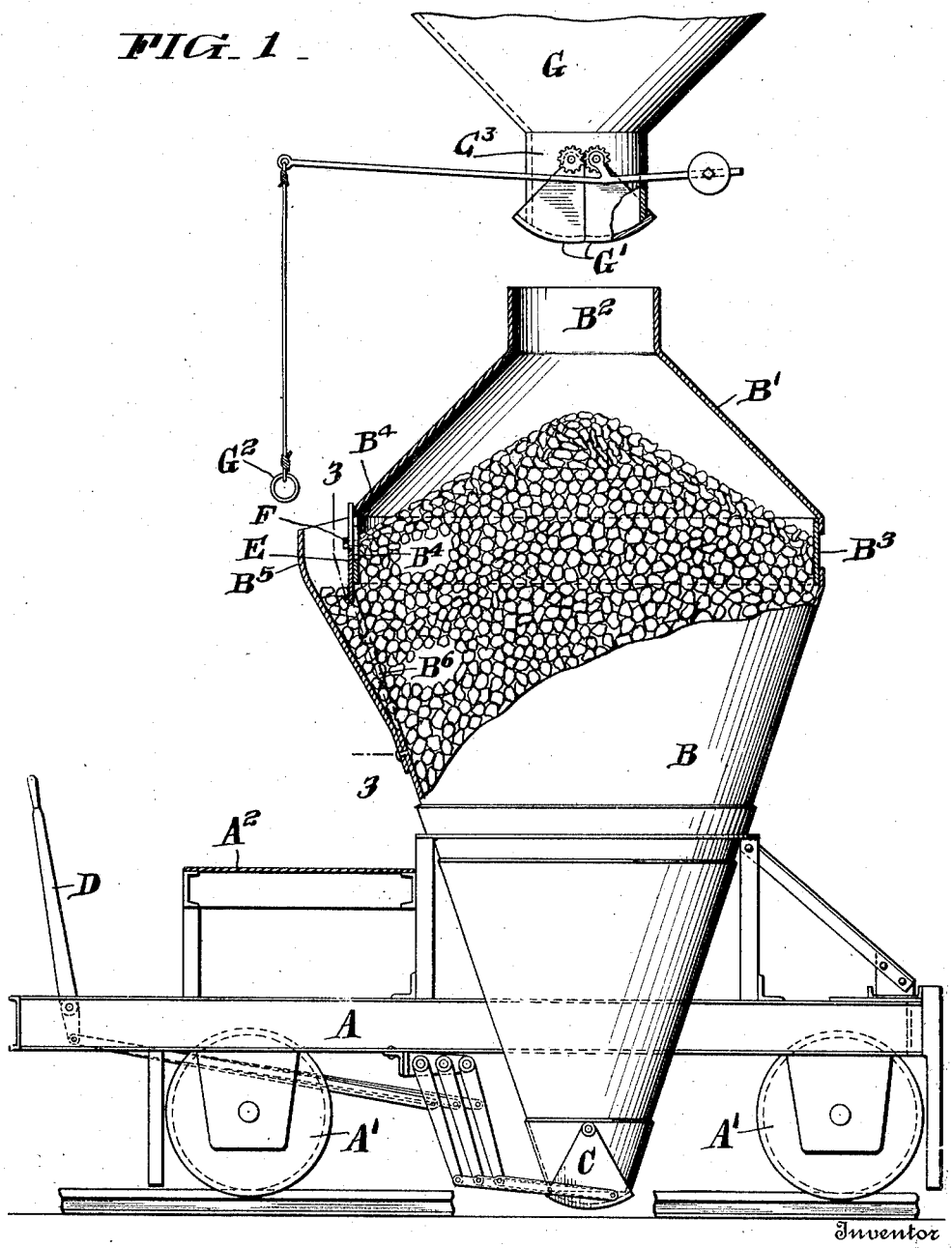

UNITED STATES PATENT OFFICE.

LOUIS WILPUTTE, OF NEW ROCHELLE, NEW YORK, ASSIGNOR OF TWO-THIRDS TO ALICE A. WILPUTTE, OF NEW ROCHELLE, NEW YORK.

COAL-CHARGING LORRY.

1,303,526. Specification of Letters Patent. Patented May 13, 1919.

Application filed September 1, 1916. Serial No. 117,980.

*To all whom it may concern:*

Be it known that I, LOUIS WILPUTTE, a subject of the King of Great Britain, and a resident of New Rochelle, county of Westchester, and State of New York, have invented a certain new and useful Improvement in Coal-Charging Lorries, of which the following is a true and exact description, reference being had to the accompanying drawings, which form a part thereof.

My present invention consists in improvements in measuring receptacles, and is especially adapted for use in coal charging lorries for supplying coal to be coked to coking chambers.

In the operation of modern coking plants it is desirable, for the most satisfactory results, to deliver carefully measured quantities of the coal to be coked to the various coking retorts or coking chambers. The actual weighing of each coal charge is open to practical disadvantages, especially as the lorry is ordinarily mounted on a track at the top of the coke oven structure, where the installation of a scale for weighing the loaded lorry introduces structural complications, while the operation of weighing the lorry involves a labor expense which it is desirable to avoid.

The object of my present invention is to provide a measuring vessel construction suitable for use in the hoppers of a coal charging lorry and the use of which makes it easy, in charging each hopper, to accurately determine when the hopper holds a predetermined but regulable amount of coal.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of my invention.

Of the drawings:

Figure 1 is a transverse section through a coal charging lorry constructed in accordance with the present invention, the section being taken on the line 1—1 of Fig. 2;

Fig. 2 is a plan view of the lorry;

Fig. 3 is a partial section taken on the line 3—3 of Fig. 1; and

Fig. 4 is a section taken on the line 4—4 of Fig. 3.

In the drawings, A represents the frame work of a coal charging lorry of the general type commonly employed on the top of coke ovens which are charged through charging openings in the upper edges of the coking chambers. The lorry is provided with wheels $A'$ for running on track rails mounted on top of the coke oven structure. As shown, the lorry is provided with four hoppers B. Each hopper, in the form shown, comprises a lower conical body portion with a discharge opening, controlled by a gate C at its lower end, a conical upper end portion $B'$ with a central charging inlet $B^2$, and a cylindrical intermediate portion $B^3$.

The wall of each hopper receptacle proper is formed with an overflow opening adjacent the upper end of the hopper, and means are provided for receiving the coal which passes out of this opening in charging the hopper, and for returning this coal to the hopper at a level below that of the overflow opening during the subsequent discharge of the hopper. As shown, the overflow opening in each hopper is in the form of a notch $B^4$ in the upper edge of the intermediate cylindrical portion $B^3$ of the hopper. The receiver for the coal passing through the overflow notch is shown as formed by a nosing or convex casing part $B^5$ which is connected at its lower edge and its vertical side edges to the outer wall of the hopper proper.

The bottom and side edges of the casing part $B^5$ are at the margin of an opening $B^6$ formed in the lower conical portion of the hopper wall below the overflow notch $B^4$, and the upper edge of the casing part $B^5$ which is adjacent the level of the upper edge of the overflow opening, is separated from the hopper wall portion $B^3$ by a considerable horizontal distance. The casing part $B^5$ of each hopper forms on the outer side of the hopper proper a pocket into the upper open end of which an operator standing on the platform $A^2$ of the lorry may look. This pocket is open to the interior of the hopper proper at its upper end through the notch $B^4$, and at a lower level through the opening $B^6$. Advantageously means are provided for varying the level of overflow through the notch $B^4$. This adjustment is obtained, with the construction shown, by means of the notched plate E adjustably secured to the hopper part $B^3$ by bolts F which advantageously, as shown, are arranged so that they may be manipulated through the open upper end of the pocket formed by the casing member B⁵.

In charging the lorry each hopper B has its inlet B² located beneath a corresponding discharge hopper G³ of an overhead coal bunker G. With the lorry in the charging position, and with the operating levers D of the lorry in the position in which the discharge gates C are closed, the operator, standing on the platform A² manipulates the handles G² to open the bunker discharge gates G' thus permitting coal to fall into the upper ends of the hoppers B. Each hopper B is permitted to fill until coal starts to rattle over the edge E' of the adjustable plate E into the pocket or conduit formed by the casing part B⁵. This indicates that the hopper has received the proper charge and the corresponding supply bunker gate G' is then closed. It will be apparent that if the hoppers B are accurately disposed beneath the bunker hoppers G, as they readily may be, the weight of coal held by each hopper at the instant at which coal begins to rattle through the overflow opening will not vary appreciably in different filling operations provided the coal does not vary in a manner affecting its specific gravity or angle of repose. The amount of each hopper charge may be varied, as conditions require, by raising or lowering the plate E which forms in effect an adjustable overflow weir. The coal running over the weir plate E at each hopper charging operation passes back into the corresponding hopper proper through the opening B⁶ as the hopper is subsequently discharged. The various hoppers may be calibrated so to speak by actually weighing the amounts of coal of different kinds and conditions held by them, with different settings of the weir plate E.

While in accordance with the provisions of the statutes I have illustrated and described the best form of my invention now known to me, it will be apparent to those skilled in the art that changes can be made in the form of my invention without departing from its spirit, and that some features of my invention can be used without a corresponding use of other features.

Having now described my invention, what I claim as new and desire to secure by Letters Patent, is:—

1. A measuring receptacle for granular material formed with a discharge opening at its lower end and with an overflow opening above said discharge opening, and provided with means for receiving material passing through said overflow opening out of the receptacle in filling the latter, and for returning such material to the receptacle when the latter is discharged, said means comprising a conduit open to the interior of said receptacle through said overflow opening, and also at a level below that of said overflow opening, and open externally of said receptacle at its upper end.

2. A measuring receptacle for granular material formed with a discharge opening at its lower end and with an adjustable overflow opening above said discharge opening, and provided with means for receiving material passing through said overflow opening out of the receptacle in filling the latter, and for returning such material to the receptacle when the latter is discharged.

3. A measuring receptacle for granular material formed with a discharge opening at its lower end and with an overflow opening above said discharge opening, and with a third opening between said overflow and discharge openings, and comprising means providing a pocket on the outer wall of the receptacle open to the interior of the receptacle through said overflow and third openings.

4. A measuring receptacle for granular material formed with a discharge opening at its lower end and with an overflow opening above said discharge opening and with a third opening between said overflow and discharge openings, and comprising means providing a pocket on the outer wall of said receptacle which is open at its upper end and is in communication with the interior of the receptacle proper through said overflow and third openings, and means, adjustable through the open upper end of said pocket, for regulating said overflow opening.

LOUIS WILPUTTE.

Copies of this patent may be obtained for five cents each, by addressing the "Commissioner of Patents, Washington, D. C."